United States Patent
Silvetti et al.

(10) Patent No.: US 11,680,754 B2
(45) Date of Patent: Jun. 20, 2023

(54) SYSTEMS AND METHODS FOR THERMAL STORAGE SOLID PHASE FORMATION REMOVAL

(71) Applicant: TRANE INTERNATIONAL INC., Davidson, NC (US)

(72) Inventors: Brian Silvetti, Tomkins Cove, NY (US); Mark Mitchell MacCracken, Miami Beach, FL (US)

(73) Assignee: TRANE INTERNATIONAL INC., Davidson, NC (US)

( * ) Notice: Subject to any disclaimer, the term of this patent is extended or adjusted under 35 U.S.C. 154(b) by 50 days.

(21) Appl. No.: 17/226,285

(22) Filed: Apr. 9, 2021

(65) Prior Publication Data
US 2022/0325963 A1  Oct. 13, 2022

(51) Int. Cl.
*F28D 20/00* (2006.01)
*F28D 20/02* (2006.01)
*F24F 5/00* (2006.01)

(52) U.S. Cl.
CPC ........ *F28D 20/0034* (2013.01); *F24F 5/0017* (2013.01); *F28D 20/021* (2013.01); *F28D 2020/0078* (2013.01); *F28F 2250/06* (2013.01); *Y02E 60/14* (2013.01)

(58) Field of Classification Search
CPC ................. Y02E 60/14; F28D 20/021; F28D 2020/0078; F24F 5/0017; F28F 2250/06
See application file for complete search history.

(56) References Cited

U.S. PATENT DOCUMENTS

| | | | |
|---|---|---|---|
| 4,831,831 | A | 5/1989 | Carter et al. |
| 5,054,298 | A | 10/1991 | MacCracken |
| 5,944,089 | A | 8/1999 | Roland |
| 9,410,748 | B2 | 8/2016 | Schneider et al. |
| 2017/0248377 | A1 | 8/2017 | De Falco et al. |
| 2019/0226735 | A1 | 7/2019 | Bissell et al. |

FOREIGN PATENT DOCUMENTS

| | | |
|---|---|---|
| DE | 102016000176 A1 | 7/2017 |
| JP | 2000097455 A * | 4/2000 |

OTHER PUBLICATIONS

Extended European Search Report issued in European Patent Application No. 22167243.9, dated Aug. 25, 2022 (8 pages).

* cited by examiner

*Primary Examiner* — Eric S Ruppert
(74) *Attorney, Agent, or Firm* — Hamre, Schumann, Mueller & Larson, P.C.

(57) ABSTRACT

Heat exchangers for thermal storage systems include a valve that can direct process fluid passing through the heat exchanger through supplemental heat exchanger tubing based on a temperature of the process fluid. The supplemental heat exchanger tubing can be located in areas where ice formation can occur during freezing of the storage fluid of the thermal storage system, but apart from the standard flow path for the heat exchanger. The valve can be a thermally-actuated valve. The thermally actuated valve can be set to divert flow of the process fluid to the supplemental tubing when the process fluid is at or above a melting temperature of the storage fluid. Methods can include selectively flowing process fluid through supplemental heat exchange tubing when it is at a temperature greater than the melting point of a storage material.

20 Claims, 4 Drawing Sheets

SYSTEMS AND METHODS FOR THERMAL STORAGE SOLID PHASE FORMATION REMOVAL

FIELD

This disclosure is directed to systems and methods for removal of solid phase from portions of a thermal storage tank.

BACKGROUND

Thermal storage tanks can contain a material used to store energy as thermal energy, through the temperature and/or phase of the material. Phase change can be an efficient method for thermal storage in a thermal storage tank due to the relatively large latent heat of phase changes compared to the energy required to heat the material when in a particular phase. Such phase changes can be accompanied by changes in volume of the material, particularly expansion of water as it is frozen into ice. This can lead to solid phase material being formed in thermal storage tanks in positions away from the heat exchanger, and where such solid material can cause issues such as reduced performance, difficulty in measuring current capacity, and/or damage to components of the thermal storage tank.

SUMMARY

This disclosure is directed to systems and methods for removal of solid phase from portions of a thermal storage tank.

As water in thermal storage devices freezes, it expands, which can raise a level of the water such that ice may form in undesirable portions of the thermal storage device, such as above the heat exchanger coils included therein. Additional heaters to remove such ice require separate control and add cost and complexity. The use of a thermally actuated valve to direct warm process fluid through additional heat exchange tubing in the areas to remove such ice allows the system to melt undesirable ice automatically without additional devices or controls. The automatic, temperature-based operation of the valve can allow the heat exchanger to operate in a freezing mode where the process fluid bypasses the areas and a thawing mode where the process fluid is directed through the areas in need of ice removal.

In an embodiment, a heat exchanger for a thermal storage system includes a heat exchange flow path defined by one or more tubes including a heat exchange surface. The heat exchange flow path includes an inlet configured to receive a process fluid and an outlet configured to allow the process fluid to exit the heat exchanger. The heat exchanger also includes one or more valves located along the heat exchanger flow path, the one or more valves configured to divert at least a portion of flow of the process fluid. The one or more valves are configured to divert the portion of flow of the process fluid when a temperature of the process fluid is above a threshold temperature. The heat exchanger further includes a solid phase removal flow path defined by a second one or more tubes including a heat exchange surface. The solid phase removal flow path including an inlet configured to receive the process fluid diverted by the one or more valves when the temperature of the process fluid is above the threshold temperature and an outlet configured to return the process fluid to the heat exchange flow path at a point in the heat exchange flow path downstream of the one or more valves.

In an embodiment, at least a portion of the solid phase removal flow path is configured to be outside a thermal storage material of the thermal storage system when the thermal storage material is in a liquid state.

In an embodiment, the threshold temperature is above a phase change temperature of the thermal storage material. In an embodiment, the threshold temperature is between at or about 35° F. and at or about 40° F.

In an embodiment, the one or more valves are thermally actuated valves.

In an embodiment, the one or more valves are located at a position along the heat exchange flow path closer to the inlet of the heat exchange flow path than to the outlet of the heat exchange flow path.

In an embodiment, the solid phase removal flow path is located above the heat exchange flow path.

In an embodiment, the heat exchange flow path includes one tube having a spiral shape.

In an embodiment, the solid phase removal flow path joins the heat exchange flow path that is downstream of the one or more valves by less than one foot with respect to the heat exchange flow path.

In an embodiment, a thermal storage system includes a heat exchanger as described above and a tank containing the thermal storage material. In an embodiment of the thermal storage system, the solid phase removal flow path is located above the heat exchange flow path. In an embodiment of the thermal storage system, the thermal storage material includes water. In an embodiment, the thermal storage system further includes a level sensor configured to determine a level of the thermal storage material in the tank. In an embodiment of the thermal storage system, the solid phase removal flow path is located above a level of the thermal storage material in the tank when the thermal storage material is in the liquid state. In an embodiment of the thermal storage system, the heat exchange flow path includes one tube having a spiral shape.

In an embodiment, a method of melting a thermal storage material in a thermal storage system includes directing a flow of a process fluid into a heat exchange flow path at a temperature greater than a melting point of the thermal storage material. The method further includes actuating a valve disposed along the heat exchange flow path such that at least a portion of the flow of process fluid is directed into a solid phase removal flow path when the process fluid at the valve is at or above a threshold temperature. The method also includes exchanging heat between the process fluid in the solid phase removal flow path and thermal storage material in proximity to the solid phase removal flow path.

In an embodiment of the method, the thermal storage material includes water. In an embodiment of the method, the solid phase removal flow path is located above a level of the thermal storage material in the tank when the thermal storage material is in the liquid state. In an embodiment of the method, the valve is automatically actuated by a temperature of the process fluid.

In an embodiment, a method of operating a thermal storage system includes melting a thermal storage material according to the method described above and freezing the thermal storage material. The freezing of the thermal storage material includes directing a flow of the process fluid into the heat exchange flow path at a temperature lower than a melting point of the thermal storage material, such that the process fluid absorbs energy from the thermal storage material, the flow of the process fluid continuing through the heat exchange flow path, past the valve.

DETAILED DESCRIPTION

This disclosure is directed to systems and methods for removal of solid phase from portions of a thermal storage tank.

Figure 1:
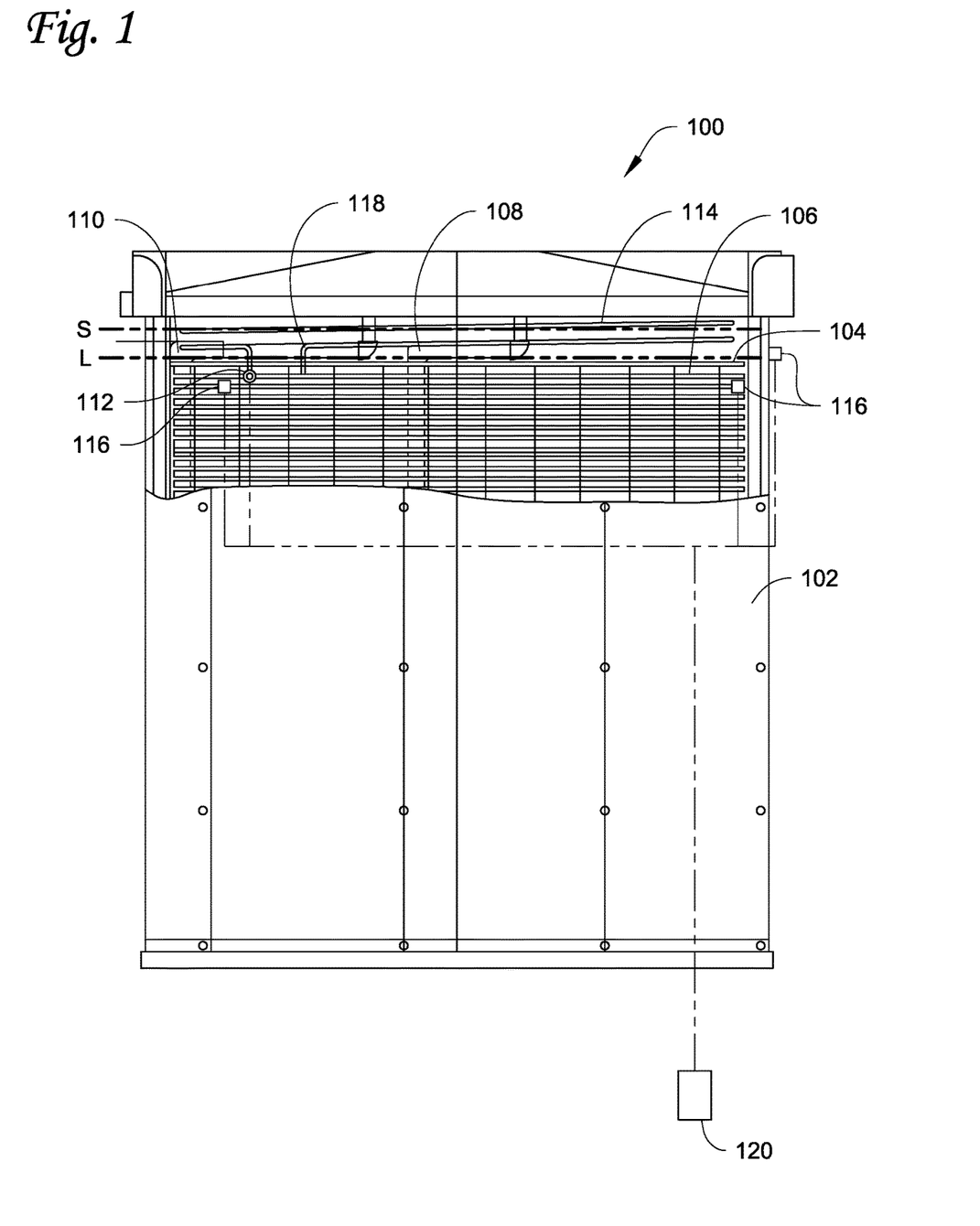
FIG. 1 shows a thermal storage system according to an embodiment.

FIG. 1 shows a thermal storage system according to an embodiment. Thermal storage system 100 includes thermal storage tank 102 and heat exchanger 104. Heat exchanger 104 includes one or more tubes 106 defining a heat exchange flow path extending from an inlet 108 to an outlet 110. A valve 112 is located along the heat exchange flow path defined by tubes 106. The valve 112 is configured such that it can divert flow from the heat exchange flow path to a supplemental coil 114 defining a solid phase removal flow path. The solid phase removal flow path extends from the valve 112 to a point along the heat exchange flow path, between valve 112 and outlet 110.

Figure 4:
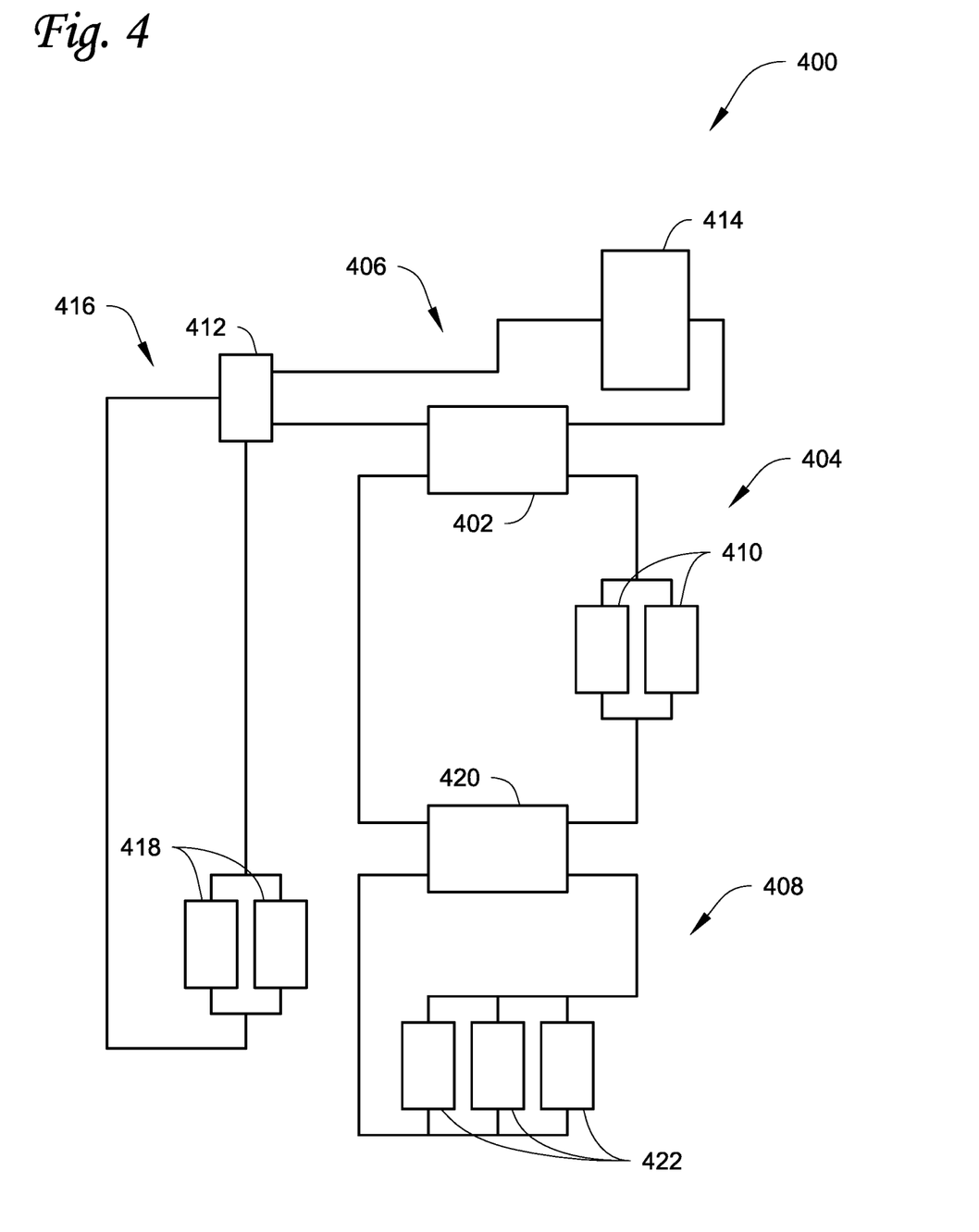
FIG. 4 shows a schematic of a building heating, ventilation, air conditioning, and refrigeration (HVACR) system according to an embodiment.

Thermal storage system 100 is a system configured to store and/or extract thermal energy from a thermal storage material. In an embodiment, the thermal storage material is a phase change material that undergoes a phase change at a predetermined temperature. In an embodiment, the thermal storage material includes water and, optionally, one or more additives such as, as a non-limiting example, glycol. In an embodiment, the thermal storage material is water. In an embodiment, the thermal storage system 100 can store energy in the form of heat contained in the thermal storage material, for example by raising the temperature of the thermal storage material or converting the thermal storage material from a solid phase to a liquid phase. In an embodiment, the thermal storage system 100 can provide energy by allowing energy to be removed from the thermal storage material by a process fluid passing through heat exchanger 104. The removal of energy from the thermal storage material can take the form of reducing a temperature of the thermal storage material and/or changing a phase of the thermal storage material from liquid to solid. The thermal storage system 100 can be integrated into, for example, a heating, ventilation, air conditioning, and refrigeration (HVACR) system to, for example, absorb and store energy from building waste heat, and to provide stored energy to support building heating, for example as shown in FIG. 4 and described below.

Thermal storage tank 102 is a tank configured to contain a mass of the thermal storage material. The tank can have any suitable shape defining an interior volume that can contain the thermal storage material in both its solid and liquid phases. The thermal storage tank 102 can further include features for supporting heat exchanger 104, sensors 116, or any other suitable features of such a thermal storage tank.

In an embodiment, the thermal storage material contained in thermal storage tank 102 can be a phase change material that expands when changing into the solid phase. In such an embodiment, the level of the phase change material in thermal storage tank 102 can raise from a liquid level L to a higher solid level S. At the higher solid level S, solid thermal storage material can form on features of the tank 102, heat exchanger 104, and/or other parts of the thermal storage system 100 that are not in proximity to the heat exchange flow path of heat exchanger 104. This can cause the material to be unable to absorb significant amounts of energy, and its presence can impair function of components such as heat exchangers, disrupt circulation of thermal storage material through the thermal storage tank 102, and/or damage components of thermal storage system 100.

Heat exchanger 104 is a heat exchanger located at least partially within thermal storage tank 102 and configured to exchange heat between a process fluid passing through heat exchanger 104 and the thermal storage material in thermal storage tank 102. A temperature of the process fluid in heat exchanger 104 can determine whether energy is added to or removed from the thermal storage material in thermal storage tank 102. When the process fluid is at a relatively higher temperature than the thermal storage material, energy can be absorbed from the process fluid by the thermal storage material, adding to the energy stored in thermal storage tank 102. When the process fluid is at a relatively lower temperature, energy can be absorbed from the thermal storage material by the process fluid, the process fluid taking energy from what is stored in thermal storage tank 102. The process fluid can be any suitable process fluid for exchanging heat in a system including the thermal storage system 100. Non-limiting examples of the process fluid include glycol, water, mixtures of water with anti-freezing additives such as glycol, and the like. In an embodiment, the process fluid is a fluid having a freezing point that is lower than the freezing point of the thermal storage material.

Heat exchanger 104 includes one or more tubes 106 defining a heat exchange flow path. The tubes can be made of a thermally conductive material selected to allow energy to readily be transferred between the thermal storage material and the process fluid contained within the one or more tubes 106. The heat exchange flow path defined by the one or more tubes 106 allows the process fluid to be carried through the heat exchanger 104 such that it can exchange energy with the thermal storage material contained within the thermal storage tank 102. The heat exchange flow path can extend through the thermal storage tank in the thermal storage tank 102 below the liquid level L. In an embodiment, the one or more tubes 106 form a spiral within the thermal storage tank 102 as can be seen by the sloping as the one or more tubes 106 extend horizontally in the view provided in FIG. 1. The heat exchange flow path can receive the process fluid at inlet 108, with the process fluid then being directed through the one or more tubes. The heat exchange flow path can extend to outlet 110, where the process fluid leaves the heat exchanger 104.

Valve 112 is included along the heat exchange flow path. Valve 112 can be located at any suitable point along the heat exchange flow path. In an embodiment, the valve 112 can be proximal to inlet 108 of heat exchanger 104. In an embodiment, valve 112 can be included towards an and of the heat exchange flow path that is closer to the inlet 108 than to the outlet 110. The position of valve 112 can be selected based on, for example, temperature, pressure, flow rate and the like for process fluid at different points in the tubing 106 during operation. In an embodiment, the position of valve 112 can further be based on the available space for the valve 112 and supplemental coil 114, the shape and position of supplemental coil 114, accessibility of valve 112 for installation and/or maintenance, or other such factors. In an embodiment, it may be preferable to include the valve 112 closer to inlet 108 than outlet 110, for example based on the temperature of the process fluid relative to its position in the heat exchange flow path. Valve 112 is any suitable valve that can selectively direct some or all of the fluid flow through the heat exchange flow path to the supplemental coil 114 or to continue through heat exchange flow path to outlet 110. The valve 112 can be a mixing or diverting valve configured to distribute flow among the heat exchange flow path and the solid phase removal flow path. Valve 112 can be automatically controlled without manual operation or human decision-making, instead being responsive to a condition or being responsive to direct control by a controller such as controller 120. Valve 112 can be controlled based on a temperature of the process fluid. In an embodiment, the valve 112 is a valve that can be directly actuated by the temperature of the process fluid at valve 112. In an embodiment, valve 112 is a self-actuating thermostatic valve. In an embodiment, valve 112 can be a controllable valve operated based on the mode of the system including thermal storage system 100. In an embodiment, valve 112 can be a controllable valve receiving control signals that are based on a measured temperature of the process fluid. When process fluid is above the melting point of the thermal storage material in thermal storage tank 102, the valve 112 can be controlled or configured to direct the process fluid through the solid phase removal flow path of supplemental coil 114. When process fluid is at or below the melting point of the thermal storage material in thermal storage tank 102, the valve 112 can be controlled or configured to direct the process fluid through the heat exchange flow path of tubes 106, to continue towards outlet 110. In an embodiment, valve 112 is configured to direct the entire flow of process fluid to one of the heat exchange flow path or the solid phase removal flow path. In an embodiment, valve 112 can be a valve system including at least two two-way valves respectively controlling flow to the heat exchange flow path and to the solid removal flow path through supplemental coil 114. In an embodiment, valve 112 is configured to control the amount of flow directed to each of the heat exchange flow path and the solid phase removal flow path, for example controlling a portion that is diverted to the solid phase removal flow path.

Supplemental coil 114 includes one or more tubes configured to convey the process fluid through a solid phase removal flow path. The supplemental coil 114 is configured to receive the process fluid from valve 112, for example when the process fluid is at a temperature greater than the melting point of the thermal storage material. The supplemental coil 114 is configured to allow the process fluid to continue travel through the system including thermal storage system 100, for example by returning the process fluid to the heat exchange flow path prior to outlet 110, or directing the process fluid to another return point of the system. The solid phase removal flow path is a flow path defined by supplemental coil 114 that passes through areas of thermal storage tank 102 which are typically not used in forming solids during operation, but where the thermal storage material may sometimes be found in solid form. For example, the solid phase removal flow path can include at least portions that are outside of those areas typically containing the thermal storage material. For example, the solid phase removal flow path can at least include portions that are vertically above a level of liquid thermal storage material within thermal storage tank 102. The solid phase removal flow path can pass over or through structures within thermal storage tank 102, such as supports, lids, sensor housings, or any other suitable structure to which the thermal storage material may freeze. In an embodiment, supplemental coil 114 can pass through one or more regions of the thermal storage system 100 configured to retain a buffer of thermal storage material in a liquid phase. Supplemental coil 114 can join the one or more tubes 106 defining the heat exchange flow path at junction 118. Junction 118 can be located between the valve 112 and outlet 110 with respect to the direction of flow through the heat exchange flow path. In an embodiment, the junction 118 is in proximity to the valve 112 with respect to the length of the heat exchange flow path. For example, the junction 118 can be located along the heat exchange flow path at a position that is up to one foot downstream of valve 112. The tubes of supplemental coil 114 can have a length, shape, orientation and/or cross-sectional area different from that of tubes 106 heat exchanger 104. The sizing and shape of supplemental coil 114 can be based on the regions needing solids removal, the shape of the heat exchanger 104, and/or factors such as pressure drop through the supplemental coil 114, performance of the heat exchanger 104 when the supplemental coil 114 is receiving process fluid, and the like.

Sensors 116 can be provided along tubes 106, along supplemental coil 114, and/or within or along thermal storage tank 102. In an embodiment, the sensors 116 include one or more temperature sensors configured to measure a temperature of the process fluid within tubes 106, for example as the process fluid approaches valve 112. In an embodiment, sensors 116 can include a level sensor measuring a level of the thermal storage material in thermal storage tank 102, for example to determine whether material is deviating from an expected level. Deviations from expected levels can be due to, for example, solid thermal storage material being trapped at locations within thermal storage tank 102 away from the bulk of the thermal storage material. In embodiments, outputs from sensors 116 can be used by a controller 120 to generate control signals for controlling valve 112. Controller 120 can optionally be included. Controller 120 can be configured to control valve 112, such as to control whether the valve passes fluid to continue along the heat exchange flow path or to divert the flow to the solids removal flow path, or how much flow is provided to each flow path. Controller 120 can make this determination based on, for example, temperature of process fluid at the valve 112, any suitable proxies indicative of temperature, an operational state of the thermal storage system (whether energy is being added or removed), levels of the thermal storage material or related values such as deviations from an expected level for the thermal storage material, or the like.

Figure 2:
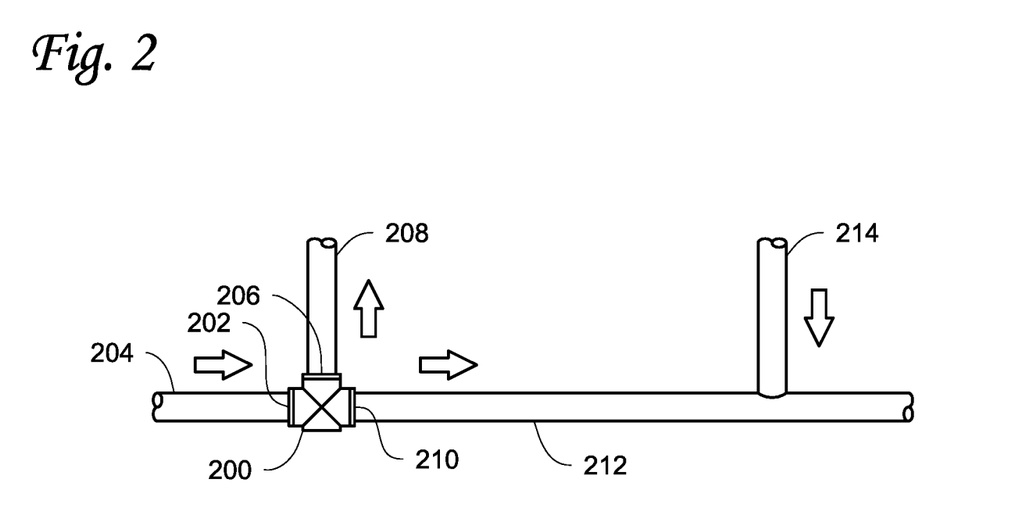
FIG. 2 shows a heat exchanger for a thermal storage system according to an embodiment.

FIG. 2 shows a schematic view of a valve and its input and outputs according to an embodiment. Valve 200 includes an inlet 202 receiving flow from an upstream portion of a heat exchange flow path 204. Valve 200 is configured to allocate the flow received at inlet 202 to a first output 206 connected to a solid phase removal flow path 208 and a second output 210 connected to a downstream portion of the heat exchange flow path 212. The inlet 202 can be located along a heat exchange flow path 212. The position of inlet 202 can be any suitable position along the heat exchange flow path 212. The position of inlet 202 can be based on the typical temperatures, pressures, flow rates, and the like for process fluid at different points in the heat exchange flow path. In an embodiment, the inlet 202 can be positioned proximate to an inlet of the heat exchanger, such that process fluid is at a relatively high temperature when it reaches inlet 202 during solids removal operating modes. The position of inlet 202 can further be based on accessibility for installation and/or maintenance, available space based on heat exchanger configuration, and other such factors. Solids removal flow path 208 can include a return line 214 where it rejoins the heat exchange flow path 212.

Valve 200 can be a diverting valve configured to distribute the flow received from inlet 202 such that some or all of the flow can exit valve 200 at first output 206 and/or second output 210. In an embodiment, valve 200 can be a self-actuating valve responsive to the temperature of flow received at inlet 202. The valve 200 can be configured to direct flow to first output 206 when at or above a predetermined temperature, and to direct flow to second output 210 when below the predetermined temperature. In an embodiment, the predetermined temperature can be a value that is above the melting point of the thermal storage material used in the thermal storage system including valve 200. In an embodiment, the predetermined value can be a temperature that is greater than the melting point of the thermal storage material by a predetermined margin, for example to ensure that the heat exchanger including valve 200 is indeed in a solids removal state when directing flow into the solid phase removal flow path 208. In an embodiment, the valve 200 can be configured to begin directing flow to the first output 206 at a temperature of at or about 35° F., and fully direct flow to the first output 206 at a temperature of at or about 40° F. when used in a thermal storage system where water is the thermal storage material. The predetermined temperature controlling flow through valve 200 can be selected based on the range of temperatures for the thermal storage material during operations, the range of temperatures for the flow of process fluid through the heat exchanger, and the like, in addition to the melting point of the thermal storage material. In an embodiment, valve 200 can be a valve system composed of separate two-way valves to achieve control of flow to first output 206 and second output 210 respectively.

Flow directed to first output 206 can then pass through a solid phase removal flow path 208, where it passes through additional tubing to thaw potential solid phase thermal storage material away from the bulk of the thermal storage material and the heat exchange flow path (for example, supplemental coil 114 as described above and shown in FIG. 1). Flow directed to second output 210 can continue through the downstream heat exchange flow path 212 to an outlet of the heat exchange flow path such as outlet 110 described above and shown in FIG. 1. The solid phase removal flow path 208 can rejoin the heat exchange flow path 212 by way of return line 214. In an embodiment, the return line 214 is in proximity to the valve 200 with respect to the length of the heat exchange flow path 212. For example, the return line 214 can join heat exchange flow path 212 at a point along the heat exchange flow path 212 that is up to one foot downstream of valve 200.

Figure 3:
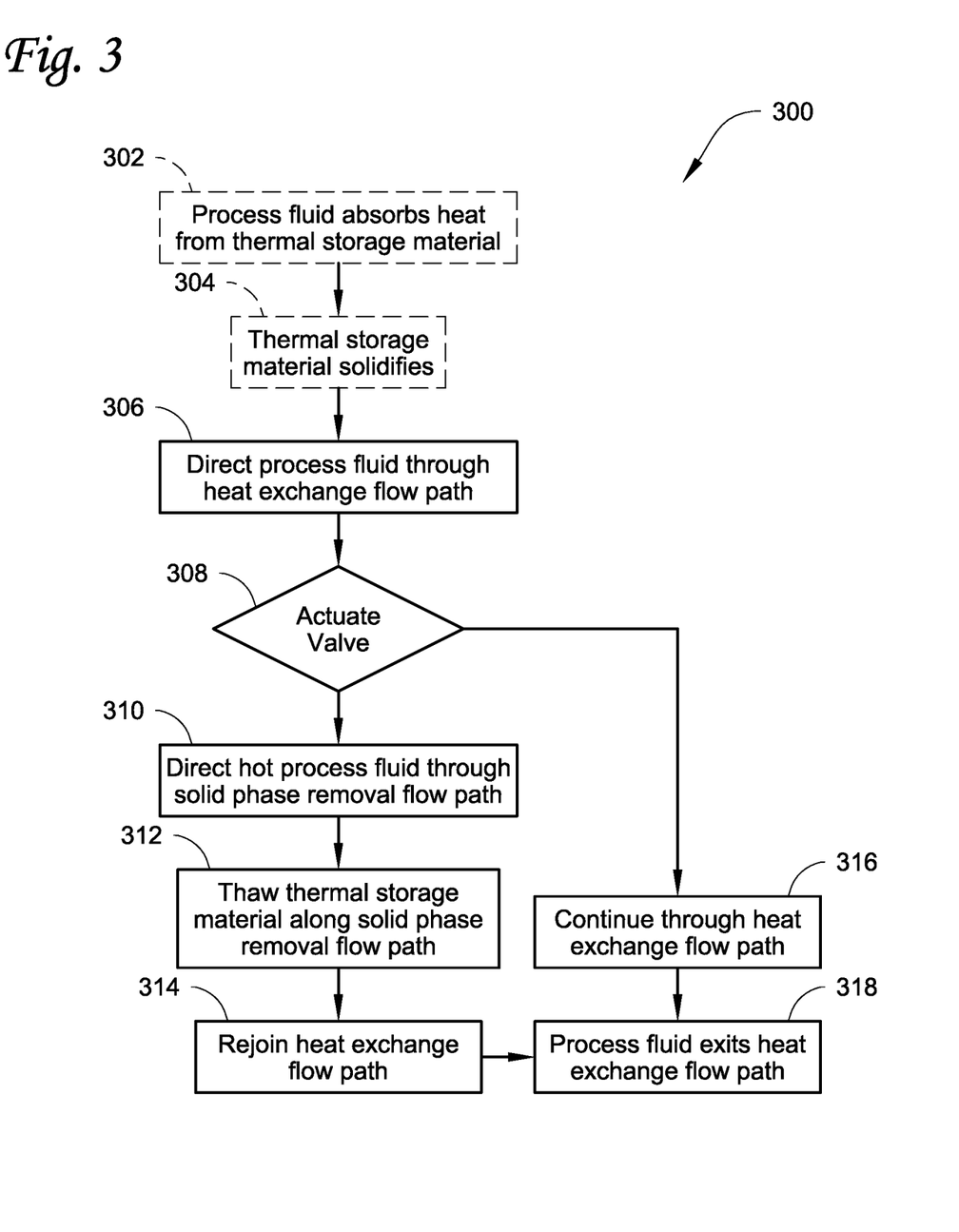
FIG. 3 shows a flowchart of a method for freezing and melting thermal storage material according to an embodiment.

FIG. 3 shows a flowchart of a method for freezing and melting thermal storage material according to an embodiment. The method 300 can include directing a process fluid through a heat exchange flow path of a heat exchanger to absorb energy from a thermal storage material 302. The method further includes the thermal storage material freezing 304 as the energy is absorbed. When the thermal storage material is frozen, the process fluid can be directed through the heat exchange flow path of the heat exchanger to provide energy absorbed by the bulk of the frozen thermal storage material 306. A valve can be actuated 308 based on a temperature of the process fluid at the valve. At least a portion of the process fluid can be directed by the valve to flow through a solid phase removal flow path when the process fluid is at a temperature above the freezing point of the thermal storage material 310. The process fluid can then provide energy that is absorbed when thawing solid thermal storage material at or near the solid phase removal flow path at 312. The process fluid can flow through the solid phase removal flow path to rejoin the heat exchange flow path 314. Alternatively, the process fluid can be directed to continue through the heat exchange flow path when the process fluid is at a temperature below a freezing point of the thermal storage material 316. The process fluid can then exit the heat exchanger 318.

Method 300 is a method of operating a thermal storage system, which can include the addition and removal of energy from a thermal storage material. The thermal energy can be added and removed from the thermal storage material as part of a process, such as heating and cooling of a building by a heating, ventilation, air conditioning, and refrigeration (HVACR) system. For example, energy can be removed from the thermal storage system to support heating operations, and energy can be added to the thermal storage system during cooling operations and/or from sources such as waste heat, solar collectors, and the like.

Optionally, the method 300 can include directing a process fluid through a heat exchange flow path of a heat exchanger to absorb energy from a thermal storage material 302. In this step, the process fluid is supplied at a temperature lower than a freezing point of the thermal storage material, such as, for example, less than 32° F. for a thermal storage system using water as the thermal storage material.

The method 300 can include the thermal storage material freezing 304 as the energy is absorbed. Since the process fluid directed through the heat exchange flow path when at a temperature lower than the freezing point of the thermal storage material, heat exchange at the portions of the heat exchanger within the thermal storage material results in the process fluid absorbing energy and carrying the energy out of the thermal storage tank. As energy is removed, the thermal storage material freezes. The freezing can result in a level of the thermal storage material rising in materials that expand as they freeze and/or result in formations of frozen thermal storage material in areas within the thermal storage tank away from the heat exchanger. Freezing of thermal storage material, particularly in locations away from the bulk of the thermal storage material, can also be due to other factors such as, for example, ambient conditions of the thermal storage tanks or the like.

When the thermal storage material is frozen, the process fluid can be directed through the heat exchange flow path of the heat exchanger to provide energy that can be absorbed by the bulk of the frozen thermal storage material 306. When the process fluid is directed through the heat exchange flow path to provide energy that can be absorbed by the bulk of the frozen thermal storage material, the process fluid is supplied at a temperature that is greater than the melting point of the thermal storage material. For example, when the thermal storage material is water, the process fluid is supplied at a temperature above 32° F. The process fluid exchanges heat with the bulk of the thermal storage material, providing energy to the thermal storage material and thus melting at least some of the thermal storage material.

A valve can be actuated 308. The valve can be a mixing or diverting valve configured to distribute flow among the heat exchange flow path and the solid phase removal flow path. Actuation of the valve at 308 can be based on, for example, a temperature of the process fluid at the valve, a level of thermal storage material in the thermal storage tank, a mode of operation of the thermal storage system, or the like. In an embodiment, the valve can be a thermally actuated valve that is directly responsive to the temperature of the process fluid at the valve. In an embodiment, the valve is a self-actuating thermostatic valve. The valve can be set to actuate at a temperature of the process fluid that is above the melting point of the thermal storage material. In an embodiment, actuation of the valve at 308 can be in response to a control signal determined based on, for example, a mode of operation of the thermal storage system, a temperature of the process fluid, a level of the thermal storage material relative to an expected level within the thermal storage tank, or any other suitable indicator of when a solids removal flow path is to be used or combinations thereof. The valve that is actuated at 308 can be located near a beginning of the exchange flow path, for example near an inlet such that the temperature of the process fluid is more strongly indicative of the operating mode and when in a solids removal mode, most capable of melting solid thermal storage material.

When the valve is actuated, at least a portion of the process fluid can be directed by the valve to flow through a solid phase removal flow path when the process fluid is at a temperature above the freezing point of the thermal storage material 310. The solid phase removal flow path can carry the process fluid through regions of the thermal storage tank that can typically be outside the portions of the thermal storage tank occupied by the thermal storage material. These regions of the thermal storage tank can be located above a level of the thermal storage material when it is in a liquid form. These regions can include, for example, regions vertically above the level of thermal storage material when it is in a liquid form. The solid phase removal flow path can pass over or through structures within thermal storage tank such as supports, lids, sensor housings, or any other suitable structure to which the thermal storage material may freeze. The process fluid can then provide energy to solid thermal storage material at or near the solid phase removal flow path, thus melting at least some of the solid thermal storage material at 312. Melted thermal storage material can flow to rejoin the bulk of the thermal storage material within the thermal storage tank.

The process fluid passing through the solid phase removal flow path can rejoin the heat exchange flow path 314. For example, the solid phase removal flow path can be configured such that it ends by joining the heat exchange flow path at a position that is between the valve and an outlet of the heat exchange flow path.

Alternatively, at least some of the process fluid can be directed to continue through the heat exchange flow path 316. In this step, some or all of the process fluid is not diverted by the valve, and thus does not get directed into the solid phase removal flow path. In an embodiment, the process fluid is not diverted when the process fluid is at a temperature below a freezing point of the thermal storage material. In an embodiment, the process fluid is not diverted when a level of the thermal storage material is within expected or suitable ranges. In an embodiment, some of the process fluid is diverted to the solid phase removal flow path, but a remainder of the process fluid is not and continues through the heat exchange flow path. In an embodiment, the process fluid can be diverted or not diverted based on time of day, for example when an operating mode of an HVACR system is according to a consistent schedule, such as removing energy from the thermal storage material during the evening and adding energy to the thermal storage material during the day.

The process fluid can then exit the heat exchanger 318. The process fluid exits at an outlet and then continues to be circulated through a system, such as an HVACR system. The process fluid can exchange heat to be heated or cooled suitably for the function required by the system and then returned to the heat exchanger of the thermal storage system at 302 or 306 depending on the temperature of the process fluid and the current operations of the system including the thermal storage system.

FIG. 4 shows a schematic of a building heating, ventilation, air conditioning, and refrigeration (HVACR) system according to an embodiment. The HVACR system 400 includes a thermal system 402, a storage circuit 404, a heating circuit 406, and a cooling circuit 408. It is understood that each of these circuits are configured to circulate a fluid, and can further include any suitable additional features for such circulation of the respective process fluids in different heating and cooling modes, such as pumps, valves, bypasses, and the like.

Thermal system 402 is a system configured to absorb energy from fluid in storage fluid circuit 404 and provide energy to the fluid of heating fluid circuit 406. Thermal system 402 can be, for example, a heat recovery chiller system. Thermal system 402 can use vapor compression cycles to absorb energy at one location such as, for example, the storage fluid circuit 404 and provide the energy to another location, such as the heating fluid circuit 406.

Storage circuit 404 is a fluid circuit configured to circulate a storage circuit process fluid, such as any described herein. Storage circuit 404 includes one or more thermal storage systems 410. The one or more thermal storage systems 410 can include, for example, one or more of the thermal storage systems 100 described above and shown in FIG. 1. Storage circuit 404 can be operated to store energy or to provide stored energy to support operation of thermal system 402. In an embodiment, storage circuit 404 can store energy when the storage circuit process fluid is provided to the one or more thermal storage systems at a temperature above that of the thermal storage material. In an embodiment, storage circuit 404 can add energy to the storage circuit process fluid when the storage circuit process fluid is at a temperature lower than the thermal storage material in the thermal storage systems 410. The added energy can support the addition of energy to a heating circuit process fluid in heating fluid circuit 406 by the thermal system 402. The storage or provision of energy from thermal storage systems 410 can be controlled, for example, based on the output temperature of storage circuit process fluid from thermal system 402.

Heating circuit 406 includes a heat exchanger 412 and a cooling tower 414. Heat exchanger 412 allows the heating circuit process fluid 406, which can be heated by thermal system 402, to provide energy to a building heating circuit 416. The building heating circuit includes heating terminal units 418 which in turn provide energy to air in conditioned spaces to heat those conditioned spaces.

Cooling circuit 408 includes heat exchanger 420, which allows the storage circuit 404 to absorb energy from cooling circuit 408, which can cool the cooling circuit process fluid. Cooling circuit 408 further includes cooling terminal units 422, which allow the cooling circuit process fluid to absorb energy from conditioned spaces, thereby cooling those conditioned spaces.

Aspects:

It is understood that any of aspects 1-15 can be combined with any of aspects 16-20.

Aspect 1. A heat exchanger for a thermal storage system, comprising:

a heat exchange flow path defined by one or more tubes including a heat exchange surface, the heat exchange flow path including an inlet configured to receive a process fluid and an outlet configured to allow the process fluid to exit the heat exchanger;

one or more valves located along the heat exchanger flow path, the one or more valves configured to divert at least a portion of flow of the process fluid, wherein the one or more valves are configured to divert the portion of flow of the process fluid when a temperature of the process fluid is above a threshold temperature; and a solid phase removal flow path defined by a second one or more tubes including a heat exchange surface, the solid phase removal flow path including an inlet configured to receive the process fluid diverted by the one or more valves when the temperature of the process fluid is above the threshold temperature and an outlet configured to return the process fluid to the heat exchange flow path at a point in the heat exchange flow path downstream of the one or more valves.

Aspect 2. The heat exchanger according to aspect 1, wherein at least a portion of the solid phase removal flow path is configured to be outside a thermal storage material of the thermal storage system when the thermal storage material is in a liquid state.

Aspect 3. The heat exchanger according to any of aspects 1-2, wherein the threshold temperature is above a phase change temperature of the thermal storage material.

Aspect 4. The heat exchanger according to any of aspects 1-3, wherein the threshold temperature is between at or about 35° F. and at or about 40° F.

Aspect 5. The heat exchanger according to any of aspects 1-4, wherein the one or more valves are thermally actuated valves.

Aspect 6. The heat exchanger according to any of aspects 1-5, wherein the one or more valves are located at a position along the heat exchange flow path closer to the inlet of the heat exchange flow path than to the outlet of the heat exchange flow path.

Aspect 7. The heat exchanger according to any of aspects 1-6, wherein the solid phase removal flow path is located above the heat exchange flow path.

Aspect 8. The heat exchanger according to any of aspects 1-7, wherein the heat exchange flow path includes one tube having a spiral shape.

Aspect 9. The heat exchanger of according to any of aspects 1-8, wherein the solid phase removal flow path joins the heat exchange flow path that is downstream of the one or more valves by less than one foot with respect to the heat exchange flow path.

Aspect 10. A thermal storage system, comprising the heat exchanger according to any of aspects 1-9 and a tank containing the thermal storage material.

Aspect 11. The thermal storage system according to aspect 10, wherein the solid phase removal flow path is located above the heat exchange flow path.

Aspect 12. The thermal storage system according to any of aspects 10-11, wherein the thermal storage material includes water.

Aspect 13. The thermal storage system according to any of aspects 10-12, further comprising a level sensor configured to determine a level of the thermal storage material in the tank.

Aspect 14. The thermal storage system according to any of aspects 10-13, wherein the solid phase removal flow path is located above a level of the thermal storage material in the tank when the thermal storage material is in the liquid state.

Aspect 15. The thermal storage system according to any of aspects 10-13, wherein the heat exchange flow path includes one tube having a spiral shape.

Aspect 16. A method of melting a thermal storage material in a thermal storage system, comprising:

directing a flow of a process fluid into a heat exchange flow path at a temperature greater than a melting point of the thermal storage material;

actuating a valve disposed along the heat exchange flow path such that at least a portion of the flow of process fluid is directed into a solid phase removal flow path when the process fluid at the valve is at or above a threshold temperature;

exchanging heat between the process fluid in the solid phase removal flow path and thermal storage material in proximity to the solid phase removal flow path.

Aspect 17. The method of according to aspect 16, wherein the thermal storage material includes water.

Aspect 18. The method according to any of aspects 16-17, wherein the solid phase removal flow path is located above a level of the thermal storage material in the tank when the thermal storage material is in the liquid state.

Aspect 19. The method according to any of aspects 16-18, wherein the valve is automatically actuated by a temperature of the process fluid.

Aspect 20. A method of operating a thermal storage system, comprising:

melting a thermal storage material according to the method of any of aspects 16-19; and freezing the thermal storage material by way of a method including:

directing a flow of the process fluid into the heat exchange flow path at a temperature lower than a melting point of the thermal storage material, such that the process fluid absorbs energy from the thermal storage material, the flow of the process fluid continuing through the heat exchange flow path, past the valve.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A heat exchanger for a thermal storage system, comprising:

a heat exchange flow path defined by one or more tubes, each of said one or more tubes including a heat exchange surface, the heat exchange flow path including an inlet configured to receive a process fluid and an outlet configured to allow the process fluid to exit the heat exchanger, the heat exchange surface configured to exchange heat between the process fluid and a thermal storage material;

one or more valves located along at least one of the one or more tubes of the heat exchange flow path, the one or more valves configured to divert at least a portion of flow of the process fluid, wherein the one or more valves are configured to divert the portion of flow of the process fluid when a temperature of the process fluid is above a threshold temperature; and a solid phase removal flow path defined by a second one or more tubes including a heat exchange surface, the solid phase removal flow path including an inlet configured to receive the process fluid diverted by the one or more valves when the temperature of the process fluid is above the threshold temperature and an outlet configured to return the process fluid to the heat exchange flow path at a point in the heat exchange flow path downstream of the one or more valves, wherein the solid phase removal flow path joins the heat exchange flow path at a junction disposed along the one or more tubes of the heat exchange flow path.

2. The heat exchanger of claim 1, wherein at least a portion of the solid phase removal flow path is configured to be outside the thermal storage material of the thermal storage system when the thermal storage material is in a liquid state.

3. The heat exchanger of claim 1, wherein the threshold temperature is above a phase change temperature of the thermal storage material.

4. The heat exchanger of claim 1, wherein the threshold temperature is between at or about 35° F. and at or about 40° F.

5. The heat exchanger of claim 1, wherein the one or more valves are thermally actuated valves.

6. The heat exchanger of claim 1, wherein the one or more valves are located at a position along the heat exchange flow path closer to the inlet of the heat exchange flow path than to the outlet of the heat exchange flow path.

7. The heat exchanger of claim 1, wherein the solid phase removal flow path is located above the heat exchange flow path.

8. The heat exchanger of claim 1, wherein the heat exchange flow path includes one tube having a spiral shape.

9. A heat exchanger for a thermal storage system, comprising:

a heat exchange flow path defined by one or more tubes including a heat exchange surface, the heat exchange flow path including an inlet configured to receive a process fluid and an outlet configured to allow the process fluid to exit the heat exchanger;

one or more valves located along the heat exchanger flow path, the one or more valves configured to divert at least a portion of flow of the process fluid, wherein the one or more valves are configured to divert the portion of flow of the process fluid when a temperature of the process fluid is above a threshold temperature; and a solid phase removal flow path defined by a second one or more tubes including a heat exchange surface, the solid phase removal flow path including an inlet configured to receive the process fluid diverted by the one or more valves when the temperature of the process fluid is above the threshold temperature and an outlet configured to return the process fluid to the heat exchange flow path at a point in the heat exchange flow path downstream of the one or more valves, wherein the solid phase removal flow path joins the heat exchange flow path at a junction, the junction downstream of the one or more valves by less than one foot along a length of the heat exchange flow path.

10. A thermal storage system, comprising the heat exchanger of claim 1 and a tank containing the thermal storage material.

11. The thermal storage system of claim 10, wherein the solid phase removal flow path is located above the heat exchange flow path.

12. The thermal storage system of claim 10, wherein the thermal storage material includes water.

13. The thermal storage system of claim 10, further comprising a level sensor configured to determine a level of the thermal storage material in the tank.

14. The thermal storage system of claim 10, wherein the solid phase removal flow path is located above a level of the thermal storage material in the tank when the thermal storage material is in the liquid state.

15. The thermal storage system of claim 10, wherein the heat exchange flow path includes one tube having a spiral shape.

16. A method of melting a thermal storage material in a thermal storage system, comprising:

directing a flow of a process fluid into a heat exchange flow path at a temperature greater than a melting point of the thermal storage material, wherein the heat exchange flow path is defined by one or more tubes, each of said one or more tubes including a heat exchange surface, the heat exchange surface configured to exchange heat between the process fluid and the thermal storage material;

actuating a valve disposed along one of the one or more tubes of the heat exchange flow path such that at least a portion of the flow of process fluid is directed into a solid phase removal flow path when the process fluid at the valve is at or above a threshold temperature; and exchanging heat between the process fluid in the solid phase removal flow path and thermal storage material in proximity to the solid phase removal flow path, wherein the solid phase removal flow path joins the heat exchange flow path at a junction, the junction disposed along one of the one or more tubes of the heat exchange flow path.

17. The method of claim 16, wherein the thermal storage material includes water.

18. The method of claim 16, wherein the solid phase removal flow path is located above a level of the thermal storage material in the tank when the thermal storage material is in the liquid state.

19. The method of claim 16, wherein the valve is automatically actuated by a temperature of the process fluid.

20. A method of operating a thermal storage system, comprising:

melting a thermal storage material according to the method of claim 16; and freezing the thermal storage material by way of a method including:

directing a flow of the process fluid into the heat exchange flow path at a temperature lower than a melting point of the thermal storage material, such that the process fluid absorbs energy from the thermal storage material, the flow of the process fluid continuing through the heat exchange flow path, past the valve.

* * * * *